July 15, 1969  T. A. ROGERS  3,455,315
SAFETY VALVE SYSTEM

Filed Feb. 21, 1964  3 Sheets-Sheet 1

THELMER A. ROGERS
*INVENTOR.*

BY *C. W. McAfee*
*Atty.*

July 15, 1969 T. A. ROGERS 3,455,315
SAFETY VALVE SYSTEM
Filed Feb. 21, 1964 3 Sheets-Sheet 2

THELMER A. ROGERS
INVENTOR.

BY *C. W. McGee*
Atty.

July 15, 1969   T. A. ROGERS   3,455,315
SAFETY VALVE SYSTEM
Filed Feb. 21, 1964   3 Sheets-Sheet 3

THELMER A. ROGERS
INVENTOR.

BY
Atty.

3,455,315
SAFETY VALVE SYSTEM
Thelmer A. Rogers, P.O. Drawer 1589,
Lubbock, Tex. 79408
Filed Feb. 21, 1964, Ser. No. 346,494
Int. Cl. F16k *17/38*
U.S. Cl. 137—14                     2 Claims This invention relates to pressure vessels and more particularly to a support relief valve system for protecting unfired pressure vessels that are accidentally exposed to fire.

This invention is for the protection of vessels carrying liquified gases. Examples of liquified gases are ammonia and petroleum gases such as butane and propane. These examples of liquified gases are not meant to be exhaustive. The vessel will be described as a trailer tank used in transporting liquified gas on the highway, although it will be understood that the invention is not limited to such, being only exemplary of its use. These vessels are not intended to be subjected to heat or fire as are certain other classes of vessels. Normally, unfired vessels operate at ambient temperatures. However, in case of accident, they are subject to heat from a fire. This fire (in the case of trailer tanks) often is caused by the tires of the trailer or the tractor. In addition to this, often the fuel tank for the tractor catches fire, adding to the heat. Past history has shown a high percentage of the tanks explode when they are subjected to fire.

Based upon the history of explosions of unfired pressure vessels that are exposed to fire, it is evident that the code vessels (by code vessels, I mean those vessels which are built in accordance to the API-ASME Unfired Pressure Vessel Code) exposed to fire usually survive as long as there is sufficient liquid in the vessel to cover the portions that are actually exposed to the heat.

If the product in the vessel is in the liquid phase as opposed to the gaseous phase, the liquid will protect the metal by maintaining it at a low temperature. As the metal tends to heat up, the liquid forms a good heat conductor to conduct the heat away from the metal. There is a definite limit of the temperature the liquid will reach because if it increases above a given temperature at a given pressure, it will evaporate. As an example, it will be assumed the liquid has a vapor pressure of 250 p.s.i. at 150° F. Therefore, if the pressure within the vessel does not exceed 250 p.s.i., the liquid in the vessel will not exceed 150° F. If the liquid is in contact with a portion of the shell of the vessel; the shell of the vessel will not greatly exceed 150° F. in this area. However, if there is gas on the other side of the shell of a certain portion, the gas does not have sufficient thermal conductivity to conduct the heat away from the shell of the vessel and it tends to become overheated and weakens.

The average estimated life of a ten thousand gallon propane vessel after it is enveloped in flame is thirty to eighty minutes. Sometimes the vessels explode while the pressure relief valves are still open. In other cases, the vessels explode after the valves close after having been open, but while the vessel is still enveloped in flame. The time that the vessel is enveloped in flame, plus the fact that the pressure relief valves operated properly, is proof that the liquid within the vessels has practically all been vaporized, but the vessel is still under full pressure. This full pressure condition in addition to overheated steel in the shell of the vessel (due to the loss of cooling liquid) is the cause of the disastrous explosions.

According to my invention, this situation is corrected by substituting a support relief valve system to drastically reduce the pressure in the vessel once any uncooled surface becomes subjected to fire. This pressure reduction is accomplished by installing heat sensors at critical points on the vessel to actuate the support relief valve system. E.g., a vessel designed for a maximum working pressure (called working pressure) of 250 p.s.i. is usually equipped with pressure relief valves which limit the maximum pressure within the vessel to 250 p.s.i. Should external heat cause the pressure within the vessel to rise to this value, the standard pressure relief valves open and the relief valves are sized so that there is sufficient flow through them to hold the pressure to approximately 250 p.s.i. If all the liquid is evaporated and the vessel is still exposed to external heat, the standard relief valves close as soon as the pressure drops below below the 250 p.s.i. Still, of course, a pressure of 245 p.s.i. is sufficient to rupture the vessel if the wall of the vessel has lost its strength due to the elevated temperature.

Therefore, according to my invention, the external heat causes a temperature sensor to actuate the support relief valve system to drastically reduce the pressure within the vessel. E.g., if the pressure were reduced to 25 p.s.i., the shell material would need retain only ten percent of its strength to maintain the integrity of the vessel as compared to 250 p.s.i. If the pressure were reduced to 10 p.s.i., it would only be necessary for the shell material to retain four percent of its strength.

The support relief system can be in the form of extra relief valves which are opened by the temperature sensor or in the form of a modification of the regular pressure relief valve so that they are opened and remain open at lower pressures responsive to excessive shell temperatures.

The standard relief valves in common use today normally open when the vessel is exposed to extreme heat. The extreme heat raises the temperature of the contents, thus raising the pressure within the vessel to above the working pressure of the vessel. The rate at which the contents are discharged is usually not critical inasmuch as the code specifies that there shall be sufficient relief valves to discharge at a suitable rate. Therefore, the opening of a support valve will not aggravate the hazard created by the discharge of the gaseous phase of the contents. This is in addition to the prevention of the pressure within the vessel from exploding the vessel because of the weakened condition of the metal due to elevated temperatures. The support relief system does not operate until the regular pressure system has reached the limit of its usefulness. If there is liquid at the critical portions of the vessel, the liquid will vaporize, raising the pressure and the regular pressure relief system will operate rather than the support system. However, at a time when the regular pressure relief system no longer protects the vessel, then the gaseous contents of the vessel will be discharged at a proper time and through controlled openings of the support system, rather than by explosion of the rupturing vessel.

It is also a characteristic of the support system that after the fire or other cause of external heat has been remedied, the support system may be inactivated and the vessel again operate on its normal relief system. It is important that it be possible for the vessel to be put back in normal operation because there might be considerable content left in the vessel. Having contents in the vessel which is being discharged represents considerable dilemma to the people of the area. Most of the liquified gases are heavier than air and are quite dangerous to be discharged. Therefore, it is the feeling of some people that it is better to have them burning at a controlled rate, than it is to have them discharged so that there is a possibility of an explosion or poisoning by the large amount of gas in the area. However, with my invention, after the direct danger of explosion from the overheated shell material of the vessel is past, the additional discharge of the gas from the vessel is prevented until the proper equipment may be brought to the scene to remove all contents from the vessel or the vessel can be moved to a proper station for the removal of its contents.

An object of this invention is the protection of vessels containing liquified gases.

Another object is for protection of vessels containing liquified gases when they are accidentally exposed to fire.

Another object is to protect vessels carrying liquified gases after the liquid contents have been removed as by vaporization.

A further object is to protect vessels carrying liquified gases after the shell of the vessel is not cooled by the contents.

A further object is to protect vessels containing liquified gases after the shell becomes heated.

Still further objects are to provide safety valves for vessels carrying liquified gases which are to protect the vessel in case it is exposed to fire and to protect the area around the vessel after the fire has been extinguished.

Still further objects are to achieve the above with a device that is sturdy, compact, durable, simple and reliable, yet inexpensive and easy to manufacture and operate.

Still further objects are to achieve the above with a method that is failproof, inexpensive, and automatic.

The specific nature of the invention as well as other objects, uses, and advantages thereof will clearly appear from the following description and from the accompanying drawing, the different view of which are not necessarily to the same scale, in which.

Figure 1:
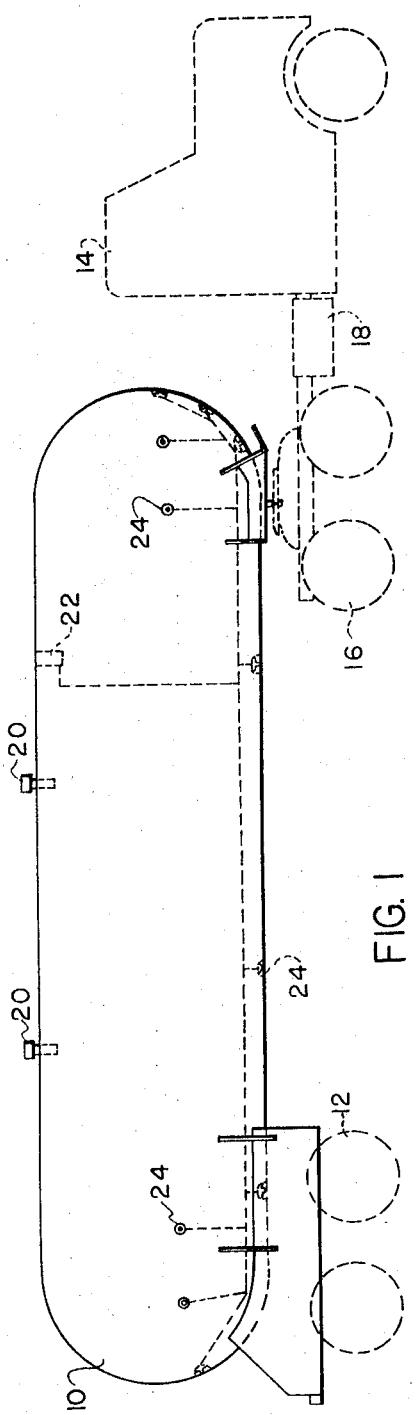
FIG. 1 is an elevational view of a vessel mounted on a trailer with a tractor (shown in broken lines) connected thereto as would be protected by safety valves according to this invention.

Referring to the drawings, and more particularly to FIG. 1, vessel 10 is mounted on rear wheels 12 so that the vessel forms a trailer adapted to be attached to tractor 14 having rear tractor wheels 16 and fuel tank 18. The vessel 10 is shown equipped with two standard pressure relief valves 20.

As stated in the introduction, occasionally the tractor tires on the wheels 16 catch on fire and the fuel tank 18 also catches on fire causing a severe heat upon the vessel 10.

Figure 2:
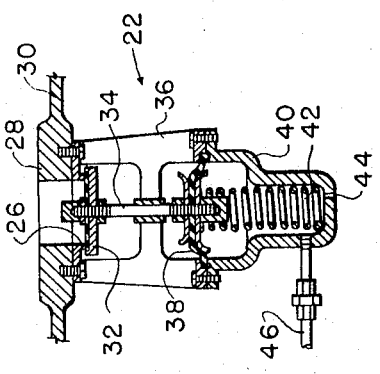
FIG. 2 is a sectional view of the vessel shell showing one embodiment of a safety valve according to this invention.
Figure 4:
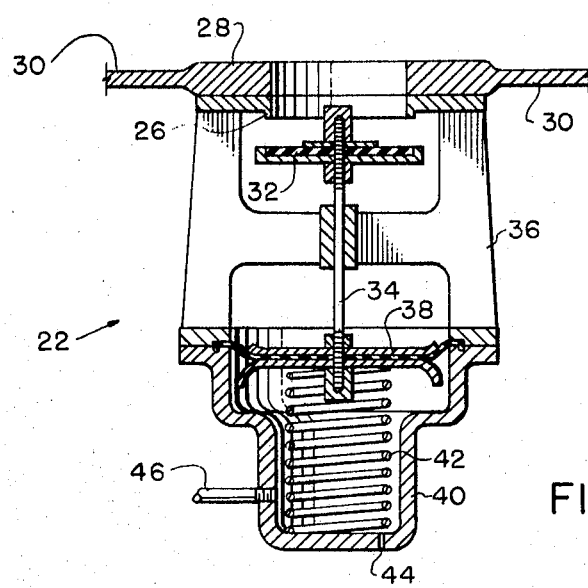
FIG. 4 is a schematic representation of the valve of FIG. 2 in the open position.

According to this invention, I have installed support relief valve 22 which is actuated by any one of a plurality of heat sensors 24 placed at critical points around the vessel 10. The valve 22 has valve seat 26 which is attached with one side opening to the outside of the vessel 10, i.e. the atmosphere (FIGS. 2 and 4). The valve seat 26 is bolted onto box 28 which is welded into the shell or wall 30 of the vessel 10. Valve disc 32 is mounted upon valve stem 34 which is immediately below the valve disc. Bracket 36 depends below valve seat 26 and is attached thereto. Diaphragm 38 is attached between the bottom of the bracket 36 and the cup 40, on the bottom of the bracket 36. The effective area of the diaphragm 38 is larger than the effective area of the bottom of the valve disc 32 which is the area closed by the circular valve seat 26. The valve stem 34 is attached by means of a nut and metal stiffener to the diaphragm 38. Spring 42 extends from the bottom of the cup 40 to the diaphragm 38. In the bottom of the cup 40 there is an orifice or extremely small hole 44. The orifice 44 is made by a No. 54 drill, as permitted by the code. Tube 46 is connected into the cup 40 and extends to all of the heat sensors 24. The heat sensors are connected in parallel.

Figure 3:
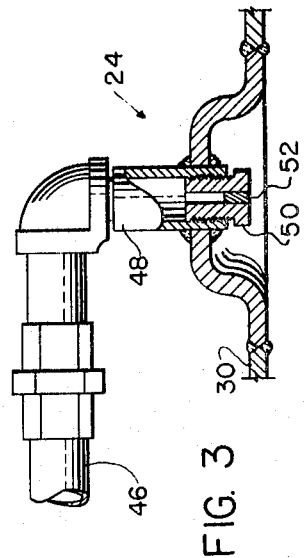
FIG. 3 is a sectional view of a vessel shell showing a heat sensor with parts broken away.

Each heat sensor 24 includes a nipple 48 which is welded into the tank shell 30 with one end outside the shell (FIG. 3). Plug 50 is threaded into the outside end of nipple 48. The plug 50 has an opening therethrough which is closed by fusible metal 52. It will be noted that the plug 50 is recessed below the surface of the shell 30 to protect the plug 50 from accidental damage. Moreover, it will be noted that the nipple 48 is attached near its end so that the plug 50 and thus the fusible metal 52 is in close thermal proximity to the shell 30 of the vessel 10. Therefore, the plug 50 senses the temperature of the shell 30 and not the ambient temperature. The tube 46 is connected to the inside end of the nipple 48.

If there is liquid within the vessel 10 at the point of the sensor 24, the heat which might be applied by a direct flame impinging on the area of the sensor 24 is conducted away from the plug 50 to the nipple 48 because of the contact of the cool liquid upon the nipple 48 and also the contact of the cool liquid upon the shell 30 and the close thermal proximity of the fusible metal 52 to the shell 30. The result is that if there is a liquid behind the sensor 24, the metal 52 does not melt and therefore, there is no activation of the support relief valve system. Stated otherwise, the sensor 24 senses whether there is liquid in the vessel at the point of the sensor. Another expression of how the sensor 24 works is that the sensor senses the temperature of the shell 30. Stated otherwise, in case of fire the sensor 24 detects whether the shell 30 around it is an uncooled portion of the shell.

In operation, the support relief valve 22 is normally closed and the pressure on either side of the diaphragm 38 is equal. I.e. the gas flow through the orifice 44 permits the pressure to equalize in cup 40. Therefore, the pressure within the vessel acting on the inside surface of the valve disc 32 holds it in place. This closing force is aided by spring 42. However, should the sensor 24 sense that a portion of the shell 30 of the vessel 10 is subjected to external heat without liquid in the portion of the vessel 10 so subjected, the fusible metal 52 melts and thereby releases the pressure within the tube 46 and the cup 40. The flow of gas through the hole 44 is insufficient to maintain pressure in the cup 40. Therefore, the pressure acting upon one side of the diaphragm 38 is great enough to force the diaphragm down as seen in FIG. 4.

As long as the plug 50 is open, the support relief valve 22 will remain open until at some very low pressure such as ten or 25 p.s.i., the spring 42 will overcome the pressure within the vessel 10 pushing against the top of the diaphragm 38 and thus close the valve 22.

If the fire is put out and it is desired to return the vessel 10 to operation temporarily at normal pressures, this can be done readily by closing the hole in the fuse plug 50. Otherwise, an ordinary plug could be inserted into the nipple 48 in place of the open plug 50 or a new plug 50 could be used. Therefore, after the danger from explosion of the vessel 10 has passed, there would be another danger of having an open vessel were it not possible to close the valve 22. There might be some residual liquid left in the bottom of the vessel. Inasmuch as most of these liquified gases, even at ambient temperatures of 70° F. have a vapor pressure far exceeding ten p.s.i., it is desirable to be able to close the valve 22 so that there is not a discharge of gas until the vessel 10 can be emptied by conventional equipment.

Figure 5:
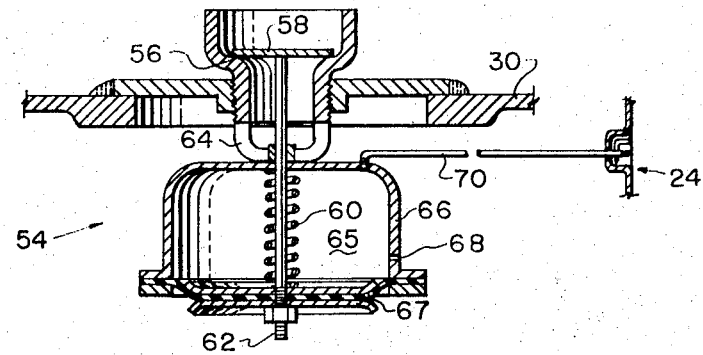
FIG. 5 is a sectional representation of a second embodiment of this invention.

FIG. 5 shows a second embodiment of a support relief valve system. In it, a relief valve 54 is used in connection with a heat sensor 24 which is the same heat sensor as shown in FIG. 3 and described above. However, the valve 54 is a modification of a pressure relief valve which is commonly used. The pressure relief valve has a valve seat 56 which is of tubular shape and has a threaded exterior so that it may be threaded into the shell 30 of the vessel 10. The valve disc 58 is on the exterior side of the seat 56 so that the pressure within the vessel 10 tends to push the disc 58 away from the seat. The disc 58 is normally held closed by the pressure of spring 60 bearing against a nut on the bottom of valve stem 62. The top of the spring 60 bears against spider 64 which forms an integral unit with the seat 56. As described to this point, the relief valve 54 is a standard unaltered valve used as a pressure relief valve such as the valves 20. As modified, the spring 60 is enclosed with flexible fluid chamber 65, which includes cup 66 and diaphragm 67. The bottom of the cup 66 has an orifice 68. The top of the cup 66 surrounds the valve stem 62 so that the stem can move up and down and is fluid tight. However, inasmuch as deliberately a small hole (orifice 68) has been created into the cup 68, this fluid tight seal is not critical. Tube 70 connects the sensor 24 in fluid communication with the interior of the flexible fluid chamber 65. Stem 62 is connected to the diaphragm 67.

In operation of the embodiment of FIG. 5, if the fusible metal 52 of the sensor 24 is intact, the pressure is the same within the flexible fluid chamber 65 as without and the relief valve 54 acts as a pressure relief valve as though the flexible fluid chamber were not surrounding the spring 60. However, should the sensor 24 detect that the portion of the shell 30 wherein it is installed is uncooled, then the fusible metal 52 will melt and open the tube 70 and the interior of the flexible fluid chamber to the atmosphere. The unbalanced pressure acting on the diaphragm 67 will aid the pressure on the bottom of the disc 58 to open the valve 54. Therefore, it may be seen that if the area of the diaphragm 67 is nine times larger than the area of the disc 58, the relief valve 54 will open at one-tenth the pressure. I.e., if it is normally set to operate with the pressure equalized within the flexible fluid chamber 65 at 250 p.s.i.; and if the pressure within the chamber 65 were atmospheric pressure; then twenty-five pounds pressure would overcome the spring 60 and permit the valve 54 to open.

Figure 6:
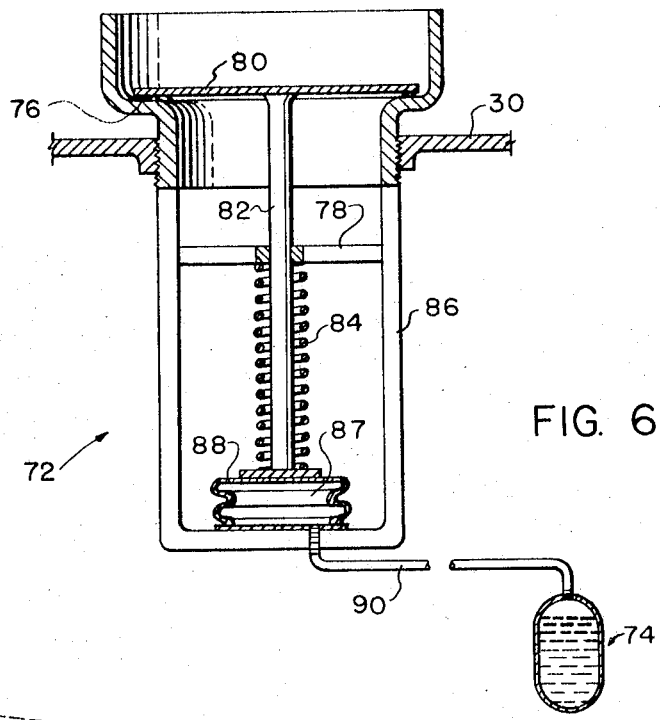
FIG. 6 is a sectional representation of a third embodiment of a safety valve according to this invention.

The embodiment shown in FIG. 6 shows another modification using a relief valve 72 which operates both as a pressure relief valve and as a support relief valve which will reduce the pressure within the vessel should the sensor 74 determine that a portion of the shell 30 of the tank is becoming overheated due to the lack of liquid contact to that heated portion. In the embodiment shown in FIG. 6, valve seat 76 is in tubular form with external threads which are threaded into the shell 30 of the vessel 10. Spider 78 depends below disc 80 to form a guide for stem 82 and a stop for spring 84. Bracket 86 depends down from the seat 76 to form a support for flexible fluid chamber 87 in the form of bellows 88. The bellows 88 is fluid tight except for connecting tube 90 which connects the interior of the bellows to sensor 74. The sensor 74 contains a liquid which vaporizes at the desired temperature. The bottom of the valve stem 82 rests on top of the bellows 88.

If the pressure within the bellows 88 is no higher than the pressure within the vessel 10, the valve 72 operates as a pressure relief valve. I.e., when the pressure on the bottom of the disc 80 is sufficient to overcome the pressure of the spring 84, the valve disc is lifted from the seat 76 permitting the escape of gas. However, should the sensor 74 be exposed to temperatures to cause the liquid to form vapor at a pressure higher than the pressure within the vessel 10, this force upon the bottom of the valve stem 84 helps the force from the pressure on the bottom of the disc 80 to overcome the pressure of spring 84 and cause the valve to open.

The bellows 88 and tube 90 are not full of liquid. There is sufficient liquid in the tube 90 to insure that the sensor 74 at all times contains liquid so that heat applied to it can form vapor to operate valve 72. Therefore, the sensor 74 in this instance, may take the form of an extension of the tube 90 formed in a serpentine path over the portion of the vessel 10 normally exposed to fire. In any event, sensor 74 is in thermal conductive relationship to that portion of the shell 30 of the vessel 10 wherein it is desired to measure for excessive temperatures due to the loss of the cooling effect of liquid.

The use of the sensor 74 and relief valve 76 is automatically resettable. I.e. when the fire is put out and the shell 30 of the vessel 10 cools, the vapor pressure of the liquid within the sensor 74 is reduced. Therefore, automatically the pressure within the vessel 10 may be increased to whatever the vapor pressure of the contents of the vessel 10 is at the ambient temperature.

Figure 7:
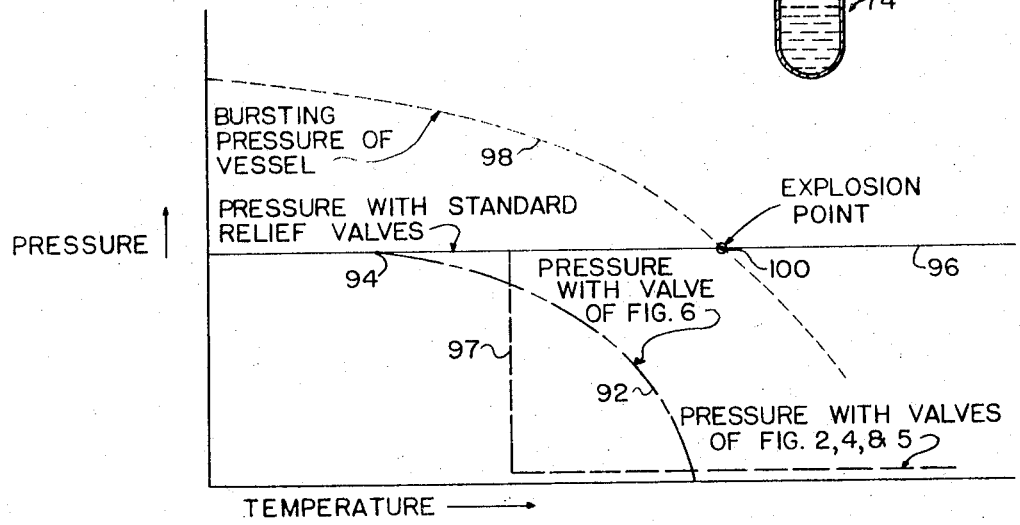
FIG. 7 is a graph illustrating the results of the different embodiments of this invention as compared to standard pressure relief valves.

The action of the valve in FIG. 6 can be seen readily from a reference to line 92 on FIG. 7. In the graph of FIG. 7 pressure is shown as the ordinate and the temperature as the abscissa. Line 96 represents the maximum pressure maintained by standard pressure relief valves. If the temperature of the sensor 74 is lower than that represented by point 94, the pressure at which the contents of the vessel is maintained is determined solely by the spring 84 at one constant value as seen by line 96. As the temperature increases, this increases the pressure within the heat sensor 74 which increases the pressure within the bellows 88. This increase of pressure added to the pressure within the vessel 10 will overcome the spring 84. Therefore, as the temperature of the shell 30 of the vessel 10 increases, the pressure within the vessel 10 is decreased.

Referring further to FIG. 7, line 98 represents the pressure at which it is calculated the vessel will burst at any given temperature. It will be seen that there is a temperature of the shell 30 which the vessel 10 will, according to calculations, burst even though the standard relief valve 20 is operating. If the line 98 representing the bursting pressure of the vessel 10 crosses at point 100, the pressure line 96 where the pressure at which the normal pressure relief systems maintain the pressure within the vessel 10, an explosion is expected to occur. I.e. the loss of strength due to heat on the shell 30 results in a vessel 10 which cannot maintain the pressure 96 which is maintained on the vessel by standard pressure relief valves presently in commercial use.

Line 97 represents the pressure as maintained in the vessel by valve embodiment controlled by a heat sensor 24. I.e. pressure is maintained at the value 96 until the temperature is reached when the fusible metal 52 melts. Any temperature above the temperature of melting of the fusible metal 52 the pressure in the vessel is maintained at a negligible amount.

Thus, it may be seen that I have provided a support relief valve system which will support the standard pressure relief valves to protect the vessel from exploding should the shell of the vessel become weakened because of elevated temperatures. By heat sensor or temperature sensor, I mean any structural device which senses or detects the presence of heat and particularly with regard to the degree of temperature. The relief valves are located as close to the top as possible so that they do not suck liquid from the vessel.

I claim as my invention:

1. In a pressure vessel containing a liquified gas under pressure, the method of protecting the vessel when exposed to intense heat comprising the steps of:
   (a) providing a first relief valve in the shell having at least one surface exposed to fluid pressure from a tube connected with a shell temperature sensing element,
   (b) exerting pressures on the valve to maintain it closed independent of pressure in the tube under normal operating conditions, (c) sensing if a portion of the shell of the vessel exposed to intense heat is elevated in temperature, (d) changing the fluid pressure in the tube connecting the sensing element to said surface of the first valve upon elevated shell temperature, (e) opening said valve responsive to said changed fluid pressure in the tube, and (f) independently opening a second relief valve responsive solely to excessive pressure in the vessel.

2. The invention as defined in claim 1 with the additional limitation of (g) opening said first valve by use of the pressure in the vessel when there is a change of pressure in the tube.

References Cited

UNITED STATES PATENTS

| | | | |
|---|---|---|---|
| 1,927,036 | 9/1933 | Johnson. | |
| 2,564,295 | 8/1951 | Benz et al. | 137—80 |
| 514,154 | 2/1894 | Lombard | 137—72 X |
| 2,508,231 | 5/1950 | De Frees | 137—68 |

FOREIGN PATENTS 490,081    1938    Great Britain.

WILLIAM F. O'DEA, Primary Examiner

R. GERARD, Assistant Examiner

U.S. Cl X.R.

137—1